UNITED STATES PATENT OFFICE.

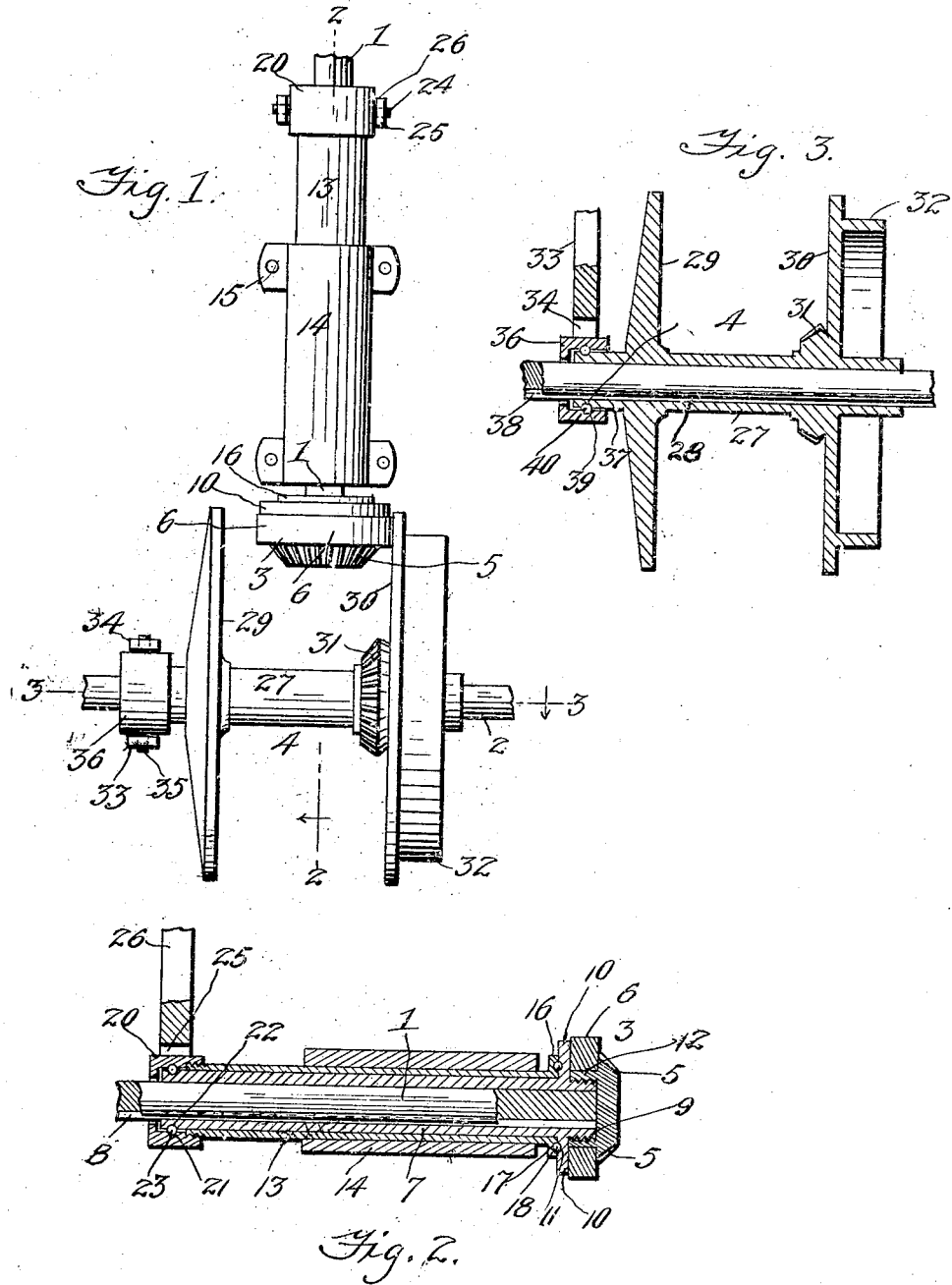

DAVID M. DEARING, OF JACKSON, MICHIGAN, ASSIGNOR OF ONE-HALF TO LOUIS F. BOOS, OF JACKSON, MICHIGAN.

VARIABLE-SPEED POWER-TRANSMISSION DEVICE.

No. 869,882.      Specification of Letters Patent.      Patented Nov. 5, 1907.

Application filed February 19, 1906. Serial No. 301,891. Renewed April 1, 1907. Serial No. 365,857.

*To all whom it may concern:*

Be it known that I, DAVID M. DEARING, a citizen of the United States, residing at Jackson, in the county of Jackson and State of Michigan, have invented certain new and useful Improvements in Variable-Speed Power-Transmission Devices; and I do declare the following to be a full, clear, and exact description of the invention, such as will enable others skilled in the art to which it appertains to make and use the same.

My invention relates to improvements in variable speed power transmission devices for use on automobiles and other machinery.

One object of the invention is to provide a device of this character in which the driven shaft may be positively driven at a high speed and frictionally driven at lower speeds, which may be varied as desired.

Another object of the invention is to improve and simplify the construction and operation of devices of this character and thereby render the same more efficient and durable in use and less expensive to manufacture.

With the above and other objects in view, the invention consists of certain novel features of construction, combination and arrangement of parts hereinafter described and claimed.

In the accompanying drawings,—Figure 1 is a bottom plan view of my improved variable speed transmission gear adapted for use on an automobile or motor vehicle, and Figs. 2 and 3 are sectional views taken respectively on the planes indicated by the lines 2—2 and 3—3 in Fig. 1.

Referring to the drawings by numeral, 1 and 2 denote the driving and driven shafts which are disposed at right angles to each other and mounted in suitable bearings. These shafts are operatively connected by driving and driven members 3, 4 mounted respectively on the shafts 1, 2. The driving member 3 has two working surfaces 5, 6, the former being a bevel toothed gear and the latter being a peripheral friction surface or wheel. These parts are carried by an inner sleeve or tube 7 which is adapted to slide longitudinally on the shaft 1, but is keyed to rotate therewith, as shown at 8. The sleeve 7 has its inner end externally screw-threaded, as at 9, and formed with a radial flange 10, having an annular groove 11 in its outer face. The screw-threads 9 are engaged by similar threads formed in the hub 12 of the bevel gear 5, between the rear face of which latter and the inner face of the flange 10 is clamped the friction wheel 6, as clearly shown in Fig. 2 of the drawings. The sleeve 7 extends through an outer sleeve 13, which is slidable in a cylindrical bearing 14 adapted to be secured to a support by means of attaching lugs 15 formed upon it, as shown.

The inner end of the outer sleeve 13 is formed with an annular flange 16, provided in its outer face with an annular groove 17, in which and in the similar groove 11 are arranged bearing balls 18. The outer end of the sleeve 13 is externally screw-threaded, as at 19, to receive a cap or collar 20, which has formed in its inner face an annular groove 21. The latter is opposed to a similar groove 22 formed in the outer end of the inner sleeve 7, and in said groove is arranged an annular row of bearing balls 23, which permit the sleeve 7 to turn within the sleeve 13 and the cap 20 to cause it to move longitudinally with the same. Upon the outer face of the cap 20 are provided at diametrically opposite points, pivot studs 24, which project into apertures formed in the forked or bifurcated end 25 of an operating lever 26.

It will be seen that by shifting the lever 26, the driving member 3 may be moved longitudinally upon the shaft 1, or toward and from the driven member 4.

The driven member 4 comprises a hub or sleeve 27, which is slidable upon but keyed to rotate with the shaft 3, as shown at 28. Upon the sleeve or body 27, upon opposite sides of the member 3 and adjacent to the opposite ends of said sleeve are opposing and friction disks 29, 30, the flat inner faces of which are adapted to be alternately moved into frictional engagement with the peripheral surface or wheel 6 of the member 3. On the inner face of the friction disk 30, adjacent to its center, is formed or secured a bevel toothed gear 31 which coacts with the toothed gear 5; and upon the outer face of said disk 30 is preferably provided an annular friction surface 32 to be engaged by a brake-band or shoe of any description. The member 4 is adapted to be moved longitudinally upon the shaft 2 to cause either of its friction disks 29 or 30 to engage the friction wheel 6, by means of a lever 33, which has its forked end 34 apertured to receive diametrically arranged pivot studs 35 upon the outer face of the cap or collar 36, which is similar to the cap 23. This cap 36 projects over the end 37 of the sleeve 27, in which is formed an annular groove 38. The latter is opposed to a similar groove 39 in the collar 36, and bearing balls 40 are arranged in said grooves, so that the sleeve 27 is free to rotate in said cap, but will be caused to move longitudinally therewith when it is shifted by the lever 33.

The operation of the device is as follows: When the shaft 1 is rotated, the lever 33 may be shifted to cause either of the friction disks 29, 30 to engage the friction surface 6, so that the shaft 2 will be rotated in either direction. When the surface or wheel 6 is so engaged with either of the disks, the speed of the shaft 2 may be varied as desired, by shifting the lever 26, which moves the member 3 toward and from the member 4. When the lever 33 is shifted so that the disk 30 engages the wheel 6, the shaft 2 will be driven in a forward direction, and as the said wheel is moved inwardly upon the said disk, the speed of the shaft 2 will be gradually increased until the bevel gears 5 and 31 mesh with each other and drive the shaft 2 positively at its highest speed.

Having thus described my invention, what I claim as new and desire to secure by Letters-Patent is:—

1. In a device of the character described, a driving member having a bevel toothed working surface and a flat peripheral working surface, a driven member having opposing flat working surfaces to coact with the peripheral surface on said driving member and a bevel toothed working surface adjacent to the center of one of said flat surfaces to coact with the toothed surface upon said driving member, and means for varying the relative positions of said members for the purpose set forth.

2. In a device of the character described, right angularly disposed drive and driven shafts, a driving member slidably but non-rotatably mounted upon said driving shaft and consisting of a bevel toothed gear and a peripheral friction wheel, a driven member slidably but non-rotatably mounted upon said driven shaft and consisting of opposing friction disks to coact with said friction wheel, and a bevel toothed gear to coact with the gear upon said driving member, and means for shifting said members upon their shafts, substantially as described and for the purpose set forth.

3. In a device of the character described, a driving shaft, a sleeve slidably but rotatably mounted upon the same, a toothed bevel gear upon said sleeve, a friction wheel upon said sleeve adjacent to said gear, a driven shaft disposed at right angles to said drive shaft, a sleeve slidably but non-rotatably mounted upon said driven shaft, friction disks upon the last mentioned sleeve upon opposite sides of the driving shaft, a bevel toothed gear upon the last mentioned sleeve to coact with the first mentioned toothed gear, and levers for shifting said sleeves upon their respective shafts, substantially as described and for the purpose set forth.

4. In a device of the character described, a bearing, an outer sleeve slidable longitudinal in said bearing and having external screw-threads at one end and a radial flange at its opposite end, an inner sleeve in said outer sleeve provided at one end with external screw-threads and a radial flange, an annular row of bearing balls between said flanges, a rotatable element engaged with the outer face of the flange on said inner sleeve, a rotatable element having an internally screw-threaded hub to engage the screw-threads on said inner sleeve, a cap or collar upon the screw-threaded end of said outer sleeve, an annular row of bearing balls between said cap and said inner sleeve, and means engaged with said cap for shifting said outer sleeve longitudinally in said bearing, substantially as described.

In testimony whereof I have hereunto set my hand in presence of two subscribing witnesses.

DAVID M. DEARING.

Witnesses:
CHRISTIE A. STEARNS,
FRANK EGGLESTON.